(12) United States Patent
Bastos et al.

(10) Patent No.: US 7,570,266 B1
(45) Date of Patent: *Aug. 4, 2009

(54) MULTIPLE DATA BUFFERS FOR PROCESSING GRAPHICS DATA

(75) Inventors: Rui M. Bastos, Santa Clara, CA (US); Matthew N. Papakipos, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/357,616

(22) Filed: Feb. 16, 2006

Related U.S. Application Data

(62) Division of application No. 10/732,730, filed on Dec. 10, 2003, now Pat. No. 7,015,914.

(51) Int. Cl.
*G06T 1/20* (2006.01)
*G09G 5/39* (2006.01)
*G09G 5/36* (2006.01)
*G09G 5/00* (2006.01)

(52) U.S. Cl. ............... 345/506; 345/531; 345/558; 345/614

(58) Field of Classification Search .......... 345/506, 345/531, 418–422, 426, 614, 501–503, 559, 345/564, 558
See application file for complete search history.

(56) References Cited

U.S. PATENT DOCUMENTS

| | | | |
|---|---|---|---|
| 6,118,452 A * | 9/2000 | Gannett | 345/418 |
| 6,614,444 B1 * | 9/2003 | Duluk et al. | 345/581 |
| 6,801,203 B1 | 10/2004 | Hussain | |
| 6,898,692 B1 * | 5/2005 | Cameron et al. | 712/22 |

\* cited by examiner

*Primary Examiner*—Kee M Tung
*Assistant Examiner*—Hau H Nguyen
(74) *Attorney, Agent, or Firm*—Patterson & Sheridan, LLP

(57) ABSTRACT

Multiple output buffers are supported in a graphics processor. Each output buffer has a unique identifier and may include data represented in a variety of fixed and floating-point formats (8-bit, 16-bit, 32-bit, 64-bit and higher). A fragment program executed by the graphics processor can access (read or write any of the output buffers. Each of the output buffers may be read from and used to process graphics data by a fragment shader within the graphics processor. Likewise, each output buffer may be written to by the graphics processor, storing graphics data such as lighting parameters, indices, color, and depth.

11 Claims, 8 Drawing Sheets

US 7,570,266 B1

MULTIPLE DATA BUFFERS FOR PROCESSING GRAPHICS DATA

CROSS-REFERENCE TO A RELATED APPLICATION

This application is a divisional of application U.S. Ser. No. 10/732,730 filed Dec. 10, 2003 now U.S. Pat. No. 7,015,914 and incorporated herein by reference.

FIELD OF THE INVENTION

One or more aspects of the invention generally relate to processing graphics data in a programmable graphics processor, and more particularly to writing graphics data associated with a buffer.

BACKGROUND

Current graphics data processing is exemplified by systems and methods developed to perform a specific operation on several graphics data elements, e.g., linear interpolation, tessellation, texture mapping, depth testing. Traditionally graphics processing systems were implemented as fixed function computation units and more recently the computation units are programmable to perform a limited set of operations. Computation units are connected in a "shading pipeline" to perform shading operations. Processed graphics data including pixel color and depth values are output by the shading pipeline and written to output buffers in memory. Conventional graphics systems support three output buffers for writing processed graphics data to: a depth buffer, a front color buffer, and a back color buffer, each with a specific purpose. The output buffer or output buffers are predetermined by an application and communicated to the graphics system using a register write or program instruction. The ability to write processed graphics data to additional user defined output buffers and to directly access each output buffer, including the additional user-defined output buffers, facilitates the development of more advanced shading algorithms.

For the foregoing reasons, it is desirable to support additional output buffers, each output buffer accessible by the shading pipeline.

SUMMARY

Various embodiments of a method of the invention include processing fragment data for multiple output buffers. Fragment data is processed as specified by the fragment program to produce processed fragment data for the multiple output buffers. An output buffer identifier associated with the processed fragment data is determined. The processed fragment data is stored in an output buffer corresponding to the output buffer identifier.

Various embodiments of the invention include a graphics processor configured to produce data for multiple output buffers, each output buffer associated with a unique output buffer identifier. The graphics processor includes a fragment processing pipeline, a shader read interface, and a write interface. The fragment processing pipeline is configured to process graphics data to produce processed graphics data for the multiple output buffers and determine at least one output buffer identifier associated with the processed graphics data. The shader read interface is configured to read processed graphics data associated with an output buffer identifier from an output buffer stored in a memory. The write interface is configured to write processed graphics data associated with at least one output buffer identifier to an output buffer stored in the memory.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

The current invention involves new systems and methods for processing graphics data elements using multiple output buffers, each output buffer accessible by a programmable graphics processor.

Figure 1:
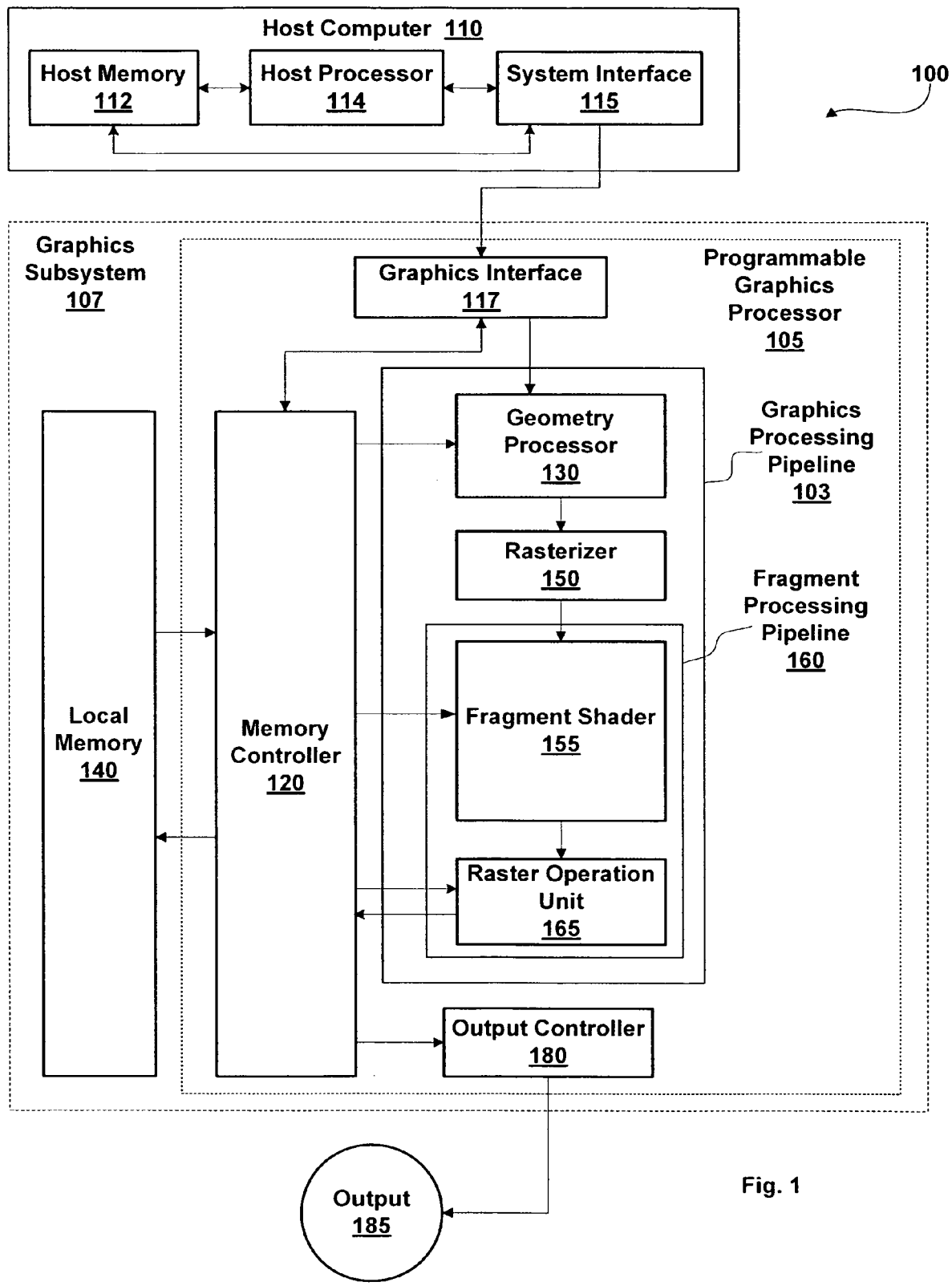
FIG. 1 is a block diagram of an exemplary embodiment of a respective computer system in accordance with one or more aspects of the present invention including a host computer and a graphics subsystem.

FIG. 1 is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host computer 110 communicates with Graphics Subsystem 107 via System Interface 115 and a Graphics Interface 117. Graphics Subsystem 107 includes a Local Memory 140 and a graphics processor, Programmable Graphics Processor 105. Programmable Graphics Processor 105 uses memory to store graphics data in multiple output buffers and program instructions, where graphics data is any data that is input to or output from computation units within Programmable Graphics Processor 105. Graphics memory is any memory used to store program instructions to be executed by Programmable Graphics Processor 105 or output buffers containing graphics data. Graphics memory may include portions of Host Memory 112, Local Memory 140 directly coupled to Programmable Graphics Processor 105, register files coupled to the computation units within Programmable Graphics Processor 105, and the like.

In addition to Graphics Interface 117, Programmable Graphics Processor 105 includes a Graphics Processing Pipeline 103, a Memory Controller 120 and an Output Controller 180. Data and program instructions received at Graphics Interface 117 can be passed to a Geometry Processor 130 within Graphics Processing Pipeline 103 or written to Local Memory 140 through Memory Controller 120. Memory Controller 120 includes read interfaces and write interfaces that each generate address and control signals to Local Memory 140, storage resources, and Graphics Interface 117. Storage resources may include register files, caches, FIFOs (first in first out), and the like. In addition to communicating with Local Memory 140, and Graphics Interface 117, Memory Controller 120 also communicates with Graphics Processing Pipeline 103 and Output Controller 180 through read and write interfaces in Graphics Processing Pipeline 103 and a read interface in Output Controller 180. The read and write interfaces in Graphics Processing Pipeline 103 and the read interface in Output Controller 180 generate address and control signals to Memory Controller 120.

Within Graphics Processing Pipeline 105, Geometry Processor 130 and a programmable graphics fragment processing pipeline, Fragment Processing Pipeline 160, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple internal passes through Graphics Processing Pipeline 103 or in multiple passes through Fragment Processing Pipeline 160. Each pass through Programmable Graphics Processor 105, Graphics Processing Pipeline 103 or Fragment Processing Pipeline 160 concludes with optional processing by a Raster Operation Unit 165. Data produced in a pass through Programmable Graphics Processor 105, Graphics Processing Pipeline 103 or Fragment Processing Pipeline 160 may be written to an output buffer in graphics memory to be read from at a later time.

Vertex programs are sequences of vertex program instructions compiled by Host Processor 114 for execution within Geometry Processor 130 and Rasterizer 150. Fragment programs are sequences of fragment program instructions compiled by Host Processor 114 for execution within Fragment Processing Pipeline 160. Geometry Processor 130 receives a stream of program instructions (vertex program instructions and fragment program instructions) and data from Graphics Interface 117 or Memory Controller 120, and performs vector floating-point operations or other processing operations using the data. The program instructions configure subunits within Geometry Processor 130, Rasterizer 150 and Fragment Processing Pipeline 160. The program instructions and data are stored in graphics memory. When a portion of Host Memory 112 is used to store program instructions and data the portion of Host Memory 112 can be uncached so as to increase performance of access by Programmable Graphics Processor 105. Alternatively, configuration information is written to registers within Geometry Processor 130, Rasterizer 150 and Fragment Processing Pipeline 160 using program instructions, encoded with the data, or the like.

Data processed by Geometry Processor 130 and program instructions are passed from Geometry Processor 130 to a Rasterizer 150. Rasterizer 150 is a sampling unit that processes graphics primitives and generates sub-primitive data, e.g., fragment data, including coverage data. Coverage data indicates which sub-pixel sample positions within a pixel are "covered" by a fragment formed by the intersection of a pixel and a primitive. Graphics primitives include geometry data, such as points, lines, triangles, quadrilaterals, meshes, surfaces, and the like. Rasterizer 150 converts graphics primitives into sub-primitive data, performing scan conversion on the data processed by Geometry Processor 130. Rasterizer 150 outputs fragment data and fragment program instructions to Fragment Processing Pipeline 160. Therefore the fragment programs configure Fragment Processing Pipeline 160 to operate on fragment data.

The fragment programs configure the Fragment Processing Pipeline 160 to process fragment data by specifying computations and computation precision. A Fragment Shader 155 optionally is configured by fragment program instructions such that fragment data processing operations are performed in multiple passes within Fragment Shader 155. Fragment Shader 155 outputs processed fragment data and codewords generated from fragment program instructions to Raster Operation Unit 165. Raster Operation Unit 165 includes a read interface and a write interface to Memory Controller 120 through which Raster Operation Unit 165 accesses data stored in one or more output buffers in Local Memory 140 or Host Memory 112. Raster Operation Unit 165 optionally performs near and far plane clipping and raster operations, such as stencil, z test, blending, and the like, using fragment data read from the one or more buffers in Local Memory 140 or Host Memory 112 at the x,y position associated with the fragment data and the processed fragment data to produce output data. The output data from Raster Operation Unit 165 is written back to an output buffer in Local Memory 140 or Host Memory 112 at the x,y position within the output buffer associated with the output data. Alternatively, the position is represented as a pair of coordinates other than x,y, e.g., (s,t), (u,v), and the like.

In various embodiments Memory Controller 120, Local Memory 140, and Geometry Processor 130 are configured such that data generated at various points along Graphics Processing Pipeline 103 may be output via Raster Operation Unit 165 and provided to Geometry Processor 130 or Fragment Shader 155 as input. The output data is represented in one or more formats as specified by the codewords. For example, color data may be written as 16, 32, 64, or 128-bit per pixel fixed or floating-point RGBA (red, green, blue, and alpha) to be scanned out for display. Specifically, four 16-bit floating-point components (RGBA) are combined forming 64 bits of color data for each fragment. The output data, e.g., color, depth, and other parameters, may be processed according to a fragment program and stored in one or more output buffers in graphics memory to be used as texture maps, e.g., shadow map, height field, stencil, displacement maps, and the like, by a fragment program. Alternatively, color and depth output data may be written to an output buffer, and later read and processed by Raster Operation Unit 165 to generate the final pixel data prior to being scanned out for display via Output Controller 180. The graphics data processed by Geometry Processor 130, Rasterizer 150, or Fragment Shader 155 of Graphics Processing Pipeline 103 can be primitive data, surface data, pixel data, vertex data, fragment data, or the like. For simplicity, portions of this description will use the term "sample" to refer to primitive data, surface data, pixel data, vertex data, fragment data, or the like.

When processing is completed, an Output 185 of Graphics Subsystem 107 is provided using Output Controller 180.

Alternatively, Host Processor 114 reads the composited frame, e.g., output buffer, stored in Local Memory 140 through Memory Controller 120, Graphics Interface 117 and System Interface 115. Output Controller 180 is optionally configured by opcodes, received from Graphics Processing Pipeline 103 via Memory Controller 120, to deliver data to a display device, network, electronic control system, other Computing System 100, other Graphics Subsystem 110, or the like.

Figure 2A:
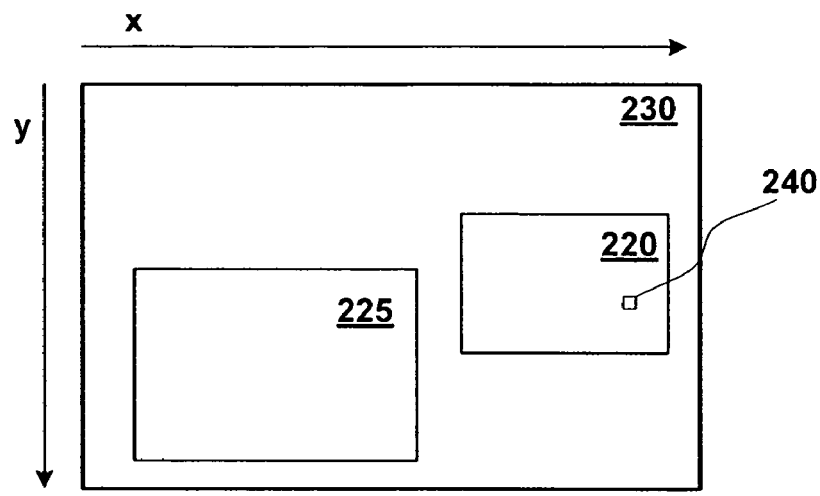
FIG. 2A is a conceptual diagram of an output buffer used by a display device.

FIG. 2A is a conceptual diagram of an Output Buffer 220 and an Output Buffer 225 displayed by a display device, e.g., monitor, projector, and the like. One or more output buffers may be selected for display by designating the one or more output buffers for display using a fragment program. An output buffer may also be selected for display using a conventional method of an application designating an output buffer as the front color buffer. Data stored in Output Buffer 220 and data stored in Output Buffer 225 are displayed on Display 230. Additional buffers of arbitrary sizes may be displayed on Display 230. Each output buffer may be positioned for display relative to Display 230. In one embodiment the position is represented as a pair of coordinates, e.g., (x,y), (s,t), (u,v), and the like.

A Sample 240, such as a pixel, within displayed Buffer 220 is associated with an x,y position relative to Display 230. For example, displayed Output Buffer 220 is positioned at an x offset and a y offset relative to the upper left corner of Display 230. The x,y position of Sample 240 relative to upper left corner of Display 230 is determined by combining the x offset and y offset with the x,y position of Sample 240 within displayed Output Buffer 220, e.g., relative to the upper left corner of displayed Output Buffer 220. The x,y position of Sample 240 relative to displayed Output Buffer 220 is consistent regardless of the position of displayed Output Buffer 220 within Display 230. In an alternate embodiment the x,y origin is in the upper left corner of Display 230 and the x,y position of Sample 240 is described relative to the x,y origin. In this embodiment the x,y position of Sample 240 changes as the position of displayed Output Buffer 220 within Display 230 changes.

Figure 2B:
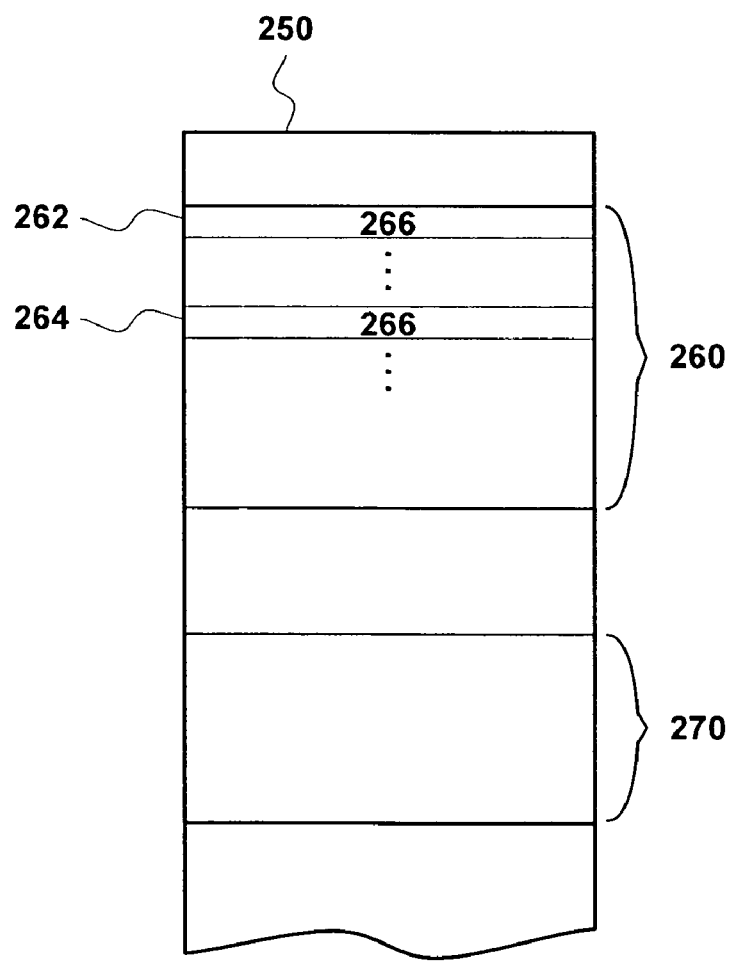
FIG. 2B is a conceptual diagram of output buffers stored in graphics memory.

FIG. 2B illustrates a Portion of Graphics Memory 250 including memory locations storing data for Output Buffer 220. Memory locations within Section 260 store data for Output Buffer 220. For example, a Memory Location 266 stores data associated with Sample 240, e.g., color, depth, stencil, shadow depth, map data, and the like. Each sample produced by Programmable Graphics Processor 105 uses a predefined amount of memory space for storing sample data. A size of Section 260 is equal to the number of Memory Locations 266 contained in Section 260 multiplied by the size of a Memory Location 266. The size of a Memory Location 266 can be any number of bits as specified in hardware or software. An output buffer may include data represented in an 8-bit fixed-point format, a 16-bit fixed-point format, a 16-bit floating-point format, a 32-bit floating-point format, and the like. The number of memory locations contained in a section can vary for each output buffer.

A Memory Location Address 264 is used to access Memory Location 266. Memory Location Address 264 may be computed based on an x,y position within Output Buffer 220 and a base memory space address, Memory Location Address 262, corresponding to a first location within Section 260. In an alternate embodiment Memory Location Address 264 is computed based on an x,y position within Display 230, an x offset of displayed Output Buffer 220, a y offset of displayed Output Buffer 220, and Memory Location Address 262. Output Buffer 220 is also associated with a unique output buffer identifier to differentiate it from other output buffers.

A Section 270 includes memory locations storing data for another output buffer. Section 270 has a base memory space address. Each output buffer is associated with a unique output buffer identifier which may be used to determine the output buffer's corresponding base memory space address. For example a lookup table containing the base memory space address accessed using an output buffer identifier may be stored in Graphics Processing Pipeline 103.

Figure 2C:
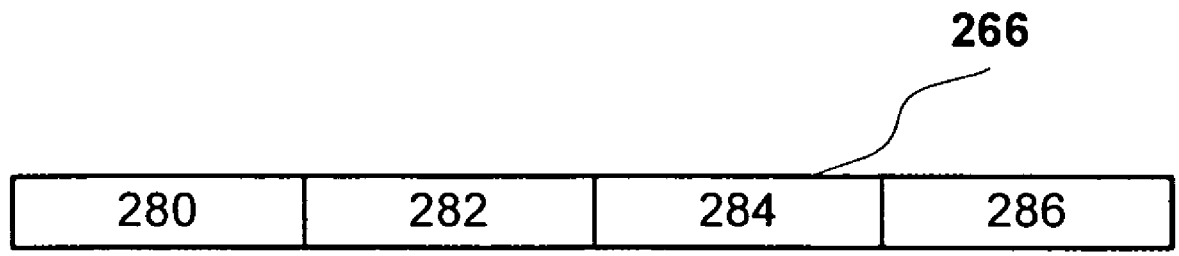
FIGS. 2C and 2D are conceptual diagrams of graphics data storage within a memory location in accordance with one or more aspects of the present invention.

FIG. 2C is a conceptual diagram of graphics data storage, including data represented in varying formats within Memory Location 266. In FIG. 2C Memory Location 266 includes four thirty-two-bit values, Value 280, Value 282, Value 284, and Value 286. Each of the thirty-two-bit values may be represented in either a fixed-point format or in a floating-point format.

Figure 2D:
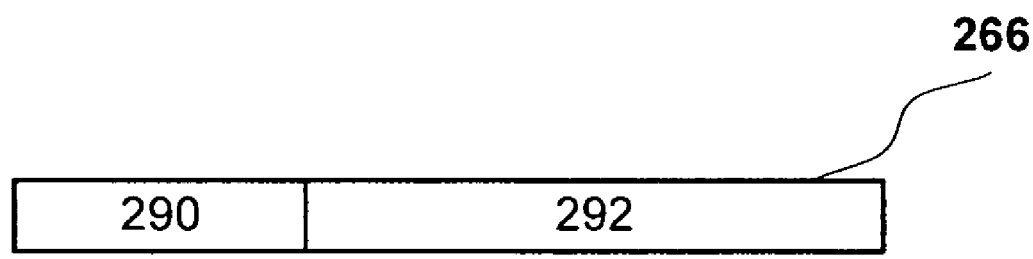

FIG. 2D is another conceptual diagram of graphics data storage, including data represented in varying formats within Memory Location 266. In FIG. 2D Memory Location 266 includes two values, Value 290 and Value 292. Value 292 is represented in a 64-bit floating-point format. Value 290 includes an 8-bit value represented in a fixed-point format. In one embodiment, Value 290 is an index, for example a shader identifier (ID) used as an index into a table storing material qualities affecting shading. In an alternate embodiment the index may be a pointer to a fragment program for processing one or more fragments. Value 292 is a depth value represented in either a floating-point or fixed-point format. In some embodiments, Memory Location 266 includes values such as light parameters, e.g., a normal vector, half angle light vector, light vector, or the like.

Figure 3:
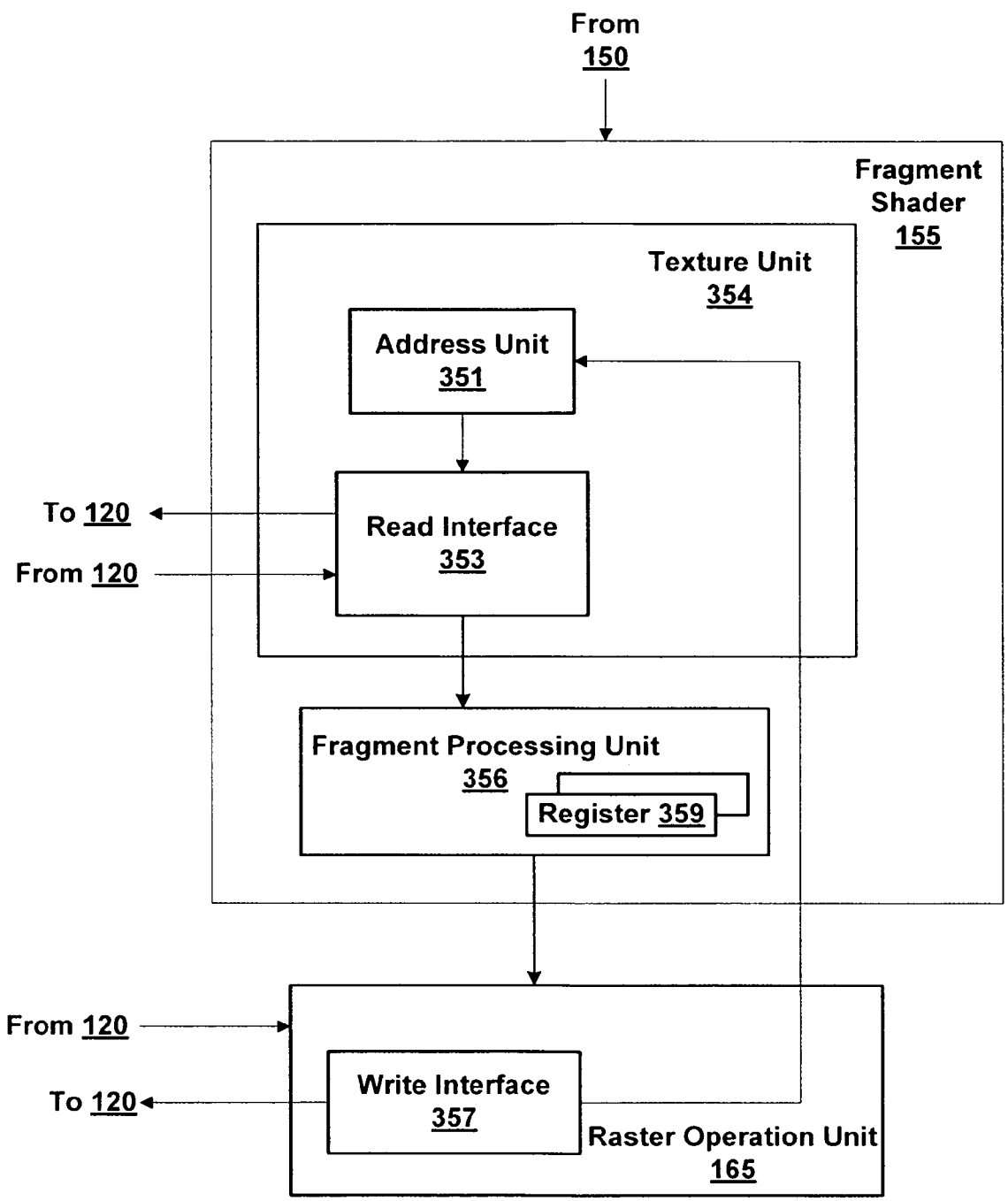
FIG. 3 is a block diagram of an exemplary embodiment of portions of Fragment Processing Pipeline of FIG. 1 in accordance with one or more aspects of the present invention.

FIG. 3 is a block diagram of an exemplary embodiment of portions of Fragment Processing Pipeline 160 in accordance with one or more aspects of the present invention. Fragment Shader 155, including Texture Unit 354, receives fragment data and fragment program instructions from Rasterizer 150. The fragment data is processed according to the fragment program instructions. A fragment program instruction may be used to determine a buffer identifier of an output buffer to write processed data to, i.e., a destination buffer. For example fragments within a surface are separated, each being selectively written to one of two output buffers based on a procedurally computed function. One of the two output buffers may be selected for writing for each fragment. Conventionally, the output buffer is predetermined for all of the fragments within a plurality of primitives such that a destination buffer may not be selected for each fragment or for the fragments within a primitive.

An Address Unit 351 receives a position associated with a sample and an output buffer identifier and determines a read address to read source data from. A Shader Read Interface 353 receives the read address from Address Unit 351 and also receives the processed fragment data and the fragment program instructions from another unit (not shown) within Texture Unit 354. Shader Read Interface 353 reads additional fragment program instructions and output buffer data (depth map, light parameters, indices, texture map, height field, bump map, shadow map, jitter values, and the like) from Local Memory 140 or Host Memory 112, via Memory Controller 120. The output buffer data stored in graphics memory may be generated by Programmable Graphics Processor 105, by Host Processor 114, by another device, by a human, or the like.

Memory Controller 120 outputs the output buffer data and the additional fragment program instructions to Shader Read Interface 353. Texture Unit 354 outputs the output buffer data, processed fragment data, and the additional fragment program instructions to a Fragment Processing Unit 356. Fragment Processing Unit 356 processes the output buffer data and processed fragment data as specified by the additional fragment program instructions and stores shaded fragment data, e.g., x, y, color, depth, configuration control, other parameters, in Registers 359 as specified by the fragment program. Fragment Shader 155 produces configuration control using the additional fragment program instructions. Fragment Processing Unit 356 outputs the shaded fragment data from Registers 359 to Raster Operation Unit 165. The shaded fragment data stored in each register in Registers 359 may be written to one or more output buffers via Raster Operation Unit 165.

In some embodiments Fragment Processing Unit 356 is configured to process at least two fragments in parallel. Likewise, Shader Read Interface 353 may also be configured to process at least two fragments in parallel. Raster Operation Unit 165 optionally processes the shaded fragment data according to the configuration control. A Write Interface 357 within Raster Operation Unit 165 writes the optionally processed shaded fragment data to an output buffer stored in Local Memory 140 or Host Memory 112, via Memory Controller 120. When a fragment program includes a flush instruction, Raster Operation Unit 165 outputs a signal to Address Unit 351 indicating that all pending write operations have been completed. The flush instruction is used to avoid read-after-write conflicts when reading from an output buffer. When a flush instruction is received by Address Unit 351, Address Unit 351 does not accept new data until receiving the signal indicating that all pending write operations have been completed from Raster Operation Unit 165.

Figure 4A:
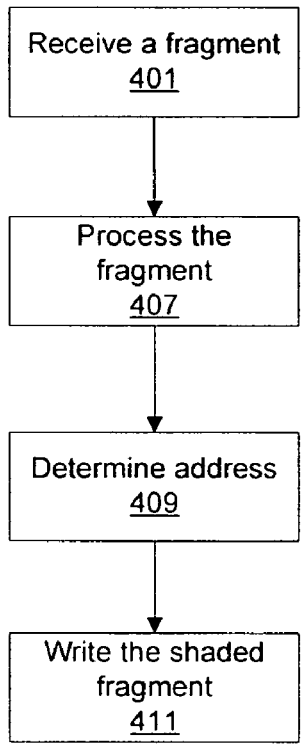
FIGS. 4A and 4B illustrate embodiments of methods in accordance with one or more aspects of the present invention.

FIG. 4A illustrates a method of processing graphics data in accordance with one or more aspects of the present invention. A fragment program specifies writing shaded fragment data to a location in an output buffer. In step 401a fragment associated with a position is received by Fragment Shader 155. The position corresponds to a location in an output buffer to be written. The output buffer is associated with an output buffer identifier. The output buffer identifier may be predetermined by an application, by a device driver, or by a fragment program.

In step 407 the fragment is shaded by Fragment Processing Unit 356 as specified by a fragment program, producing shaded fragment data. The shaded fragment data and configuration control is output by Fragment Shader 155 to Raster Operation Unit 165. In step 409 Write Interface 357 determines the memory location address to be written. In an alternate embodiment, Address Unit 351 determines the memory location address and outputs it to Write Interface 357 via Fragment Processing Unit 356. In step 411 the shaded fragment data output by Fragment Shader 155 to Raster Operation Unit 165 is written to the location in the destination buffer.

Figure 4B:
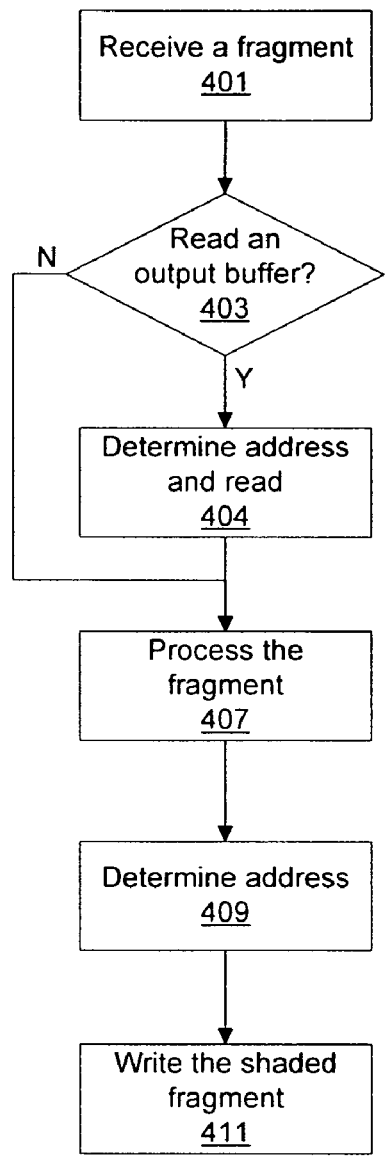

FIG. 4B illustrates a method of processing graphics data including some of the steps shown in FIG. 4A. A fragment program specifies reading data from a location in an output buffer to produce shaded fragment data to be written to the output buffer or another output buffer. In step 401a fragment is received by Fragment Shader 155. In step 403 Address Unit 351 determines if a read from an output buffer is specified by the fragment program, and, if so, in step 404 Address Unit 351 determines the memory location address to be accessed. In step 404 Address Unit 351 outputs the memory location address corresponding to a location in the output buffer to Shader Read Interface 353. If, in step 403, Address Unit 351 determines a read from an output buffer is not specified by the fragment program Address Unit 351 proceeds to step 407. Steps 407, 409, and 411 proceed as described in relation to FIG. 4A.

Multiple output buffers may be used to improve shading performance by shading only visible fragments in images. In particular, performance may be improved for images with high depth complexity. For example, geometry for a frame may be processed, i.e. fragments may be depth sorted, to produce a depth map for visible fragments. The depth map may be stored as an output buffer prior to shading. Additional processed fragment data, such as lighting parameters, color data, indices, or the like may be stored in additional output buffers. The geometry may be processed again, using the depth map to identify the visible fragments. The visible fragments may then be shaded using the additional processed fragment data read from the additional output buffers.

Figure 5A:
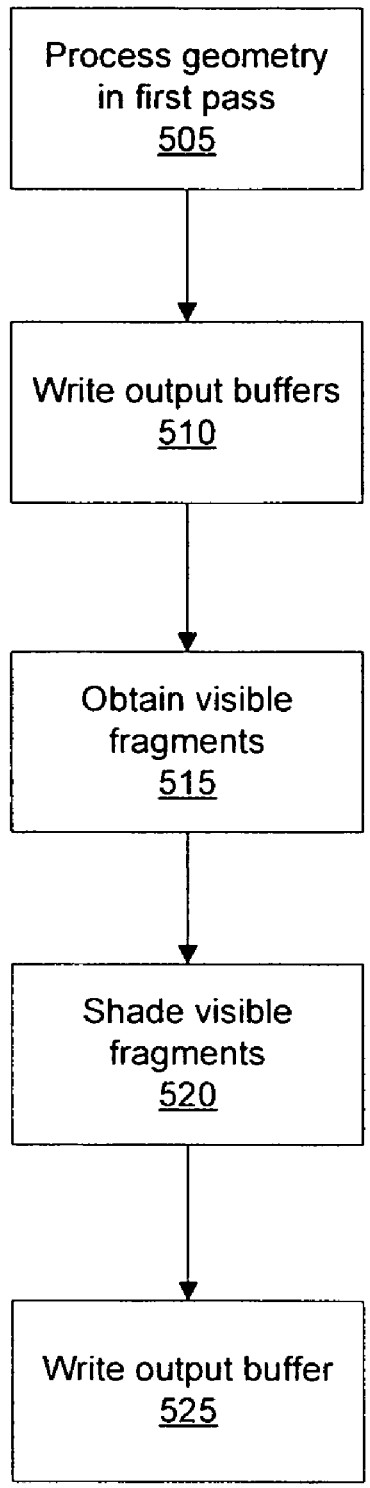
FIGS. 5A and 5B illustrate embodiments of methods of processing graphics data using deferred shading in accordance with one or more aspects of the present invention.

FIG. 5A illustrates an embodiment of a method of processing graphics data using deferred shading in accordance with one or more aspects of the present invention. In step 505 geometry, e.g. graphics primitives, is processed by Geometry Processor 130 and Rasterizer 150 to produce processed fragment data, including depth data. Fragment Processing Pipeline 160 receives the processed fragment data and computes a single depth value for each fragment. Fragment Processing Pipeline 160 then performs depth sorting using a technique known to those skilled in the art. In step 510 Fragment Processing Pipeline 160 stores a depth map for the visible fragments in an output buffer. The depth map includes a single depth value for each pixel. Fragment Processing Pipeline 160 stores a portion of the processed fragment data, such as lighting parameters, indices, or the like, in additional output buffers. After a first pass through Graphics Processing Pipeline 103, the depth map is stored in an output buffer and a portion of the processed fragment data for the visible fragments is stored in one or more additional output buffers.

In step 515 the geometry is processed by Geometry Processor 130 and Rasterizer 150 to produce the processed fragment data, including the depth data. In step 520, the depth map is read from the output buffer and is used to identify the visible fragments. Fragment Processing Pipeline 160 computes a single depth value for each fragment and compares the computed depth value for a fragment to a depth value read from a position in the depth map. The position in the depth map corresponds to the x,y position of the fragment. A fragment whose computed depth value is equal to the corresponding depth value read from the depth map is a visible fragment.

Alternatively, in step 515, a polygon, e.g. quadrilateral, corresponding to the dimensions of the depth buffer is input to and processed by Geometry Processor 130. Rasterizer 150 outputs coverage data associated with x,y positions to Fragment Processing Pipeline 160. Fragment Processing Pipeline 160 reads a depth value for each x,y position from the depth map. Likewise, processed fragment data for each x,y position is read from the one or more additional output buffers. The processed fragment data read from the one or more additional output buffers and the depth values buffers for the x,y positions represent the visible fragments.

In step 520, the visible fragments are shaded using the portion of the processed fragment data read from the additional output buffers. Non-visible fragments are culled prior to shading. Therefore texture mapping and other shading operations are not performed on non-visible fragments resulting in improved shading performance. In some embodiments, non-opaque geometry is processed in step 515 to produce non-opaque fragments. In step 520 the non-opaque fragments are shaded and blended with the visible fragments dependent on the depth map using techniques known to those skilled in the art.

In step 525 Fragment Processing Pipeline 160 stores pixel color values in at least one output buffer for display, output, or further processing. In some embodiments, Fragment Processing Pipeline 160 may store additional pixel data in other output buffers.

Figure 5B:
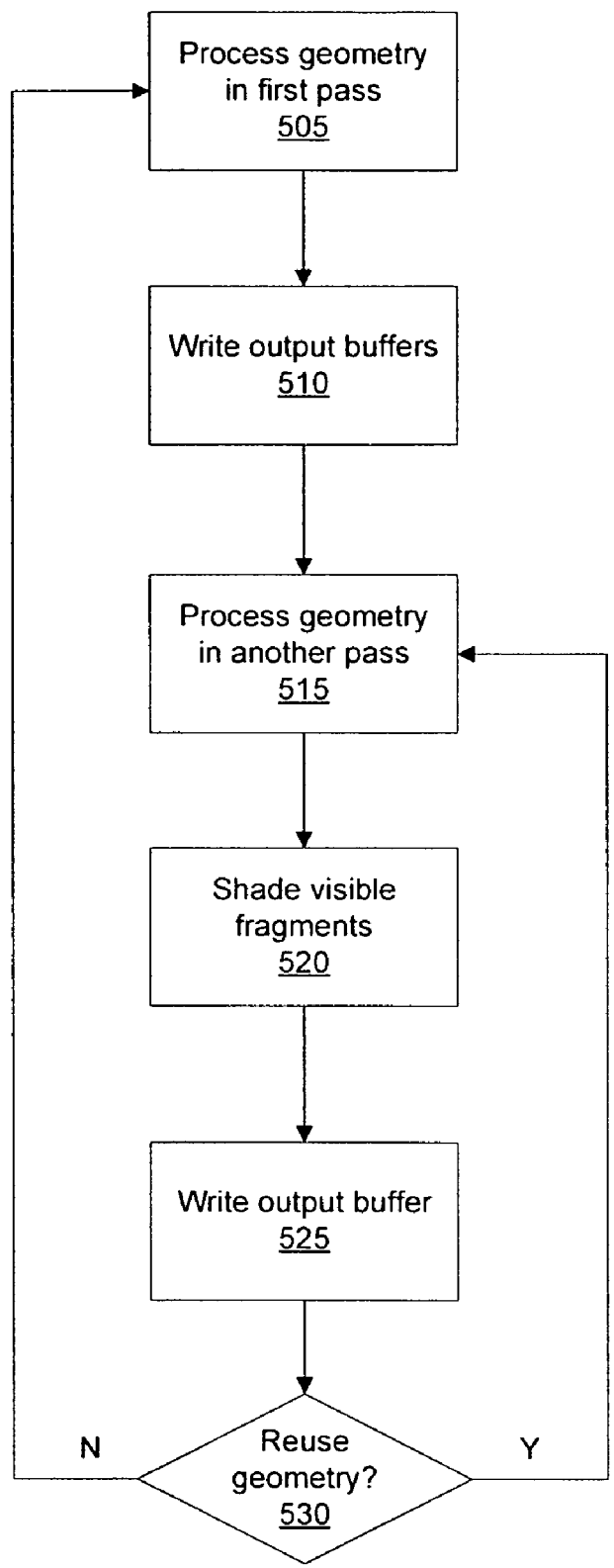

FIG. 5B illustrates a method of processing graphics data including some of the steps shown in FIG. 5A. Steps 505, 510, 515, 520, and 525 are completed as described in relation to FIG. 5A. In step 530 an application program determines if the geometry processed in step 505 will be used to produce an additional image, and, if so, steps 515, 520, 525 and 530 are repeated to produce the additional image. Therefore, the depth map is used to produce two or more images, resulting in further shading performance improvement compared with producing the two or more images without using deferred shading. If, in step 530 the application program determines the geometry processed in step 505 will not be used to produce an additional image, then Programmable Graphics Processor 105 returns to step 505.

Using multiple output buffers to perform deferred shading as described in relation to FIGS. 5A and 5B reduces shading computations for non-visible fragments and reduces texture memory read accesses because non-visible fragments are not shaded. Furthermore, the number of memory read and write accesses needed by Raster Operation Unit 165 for depth sorting is not increased when deferred shading is used.

Figure 5C:
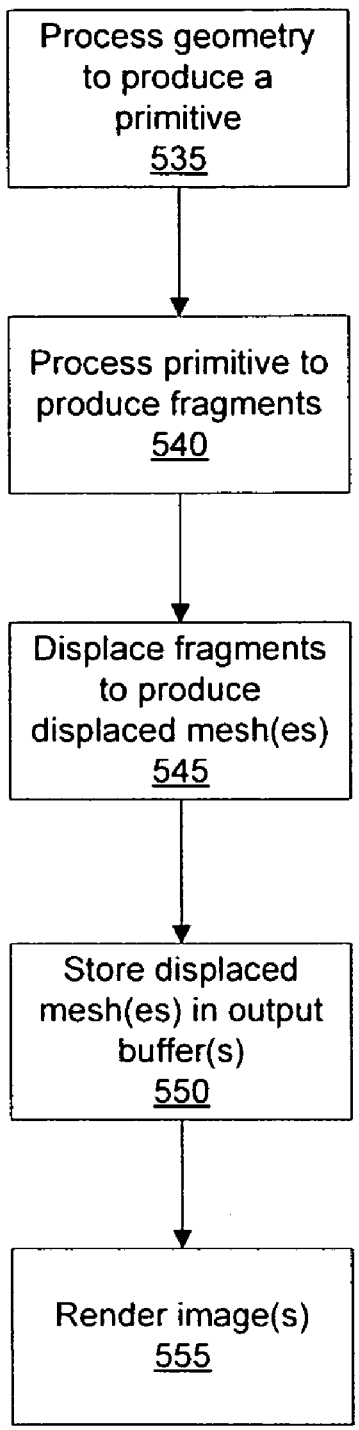
FIG. 5C illustrates an embodiment of a method of processing graphics data in accordance with one or more aspects of the present invention.

FIG. 5C illustrates an embodiment of a method of processing graphics data to produce displaced meshes in accordance with one or more aspects of the present invention. A mesh of vertices may be produced by Graphics Processing Pipeline 103 by rendering a primitive (quadrilateral or triangle) where each fragment generated during processing of the primitive is used as a vertex when the generated fragments are read back into the Geometry Processor 130 to render an image. Each fragment, before being used as a vertex, may be displaced to produce one or more displaced meshes. Each displaced mesh is stored in an output buffer and may be used as a vertex array to animate geometry associated with a character over several images, e.g., frames.

In step 535, graphics data is processed by Geometry Processor 130 to produce a primitive. In step 540, the primitive is processed by Rasterizer 150 to produce fragments. The fragments are output by Rasterizer 150 to Fragment Processing Pipeline 160, and, in step 545 Fragment Processing Pipeline 160 produces processed fragment data by displacing, along a normal vector, the coordinates of the fragment to produce one or more displaced meshes. In step 550, the displaced meshes are stored in output buffers. In step 555 the one or more displaced meshes are read by Graphics Processing Pipeline 103 from one or more output buffers during a subsequent geometry pass and interpreted as a vertex array for rendering one or more images.

In one embodiment, each displaced mesh may correspond to a displacement for application to geometry associated with a particular character for a single image. In step 555, Geometry Processor 130 processes graphics data, including the geometry associated with a character. One of the displaced meshes stored in an output buffer is used as the geometry to render an image, thereby defining the geometry associated with the character. Step 555 may be repeated using another displaced mesh to provide the positions of the vertices defining the geometry associated with the character for inclusion in the same image or another image.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A graphics processor configured to produce data for multiple output buffers, each output buffer associated with a unique output buffer identifier, comprising:
   a fragment processing pipeline configured to process graphics data to produce processed graphics data for the multiple output buffers and determine at least two output buffer identifiers associated with the processed graphics data, wherein each output buffer identifier determines an address associated with the processed fragment data, the address corresponding to a specific location within a different one of the multiple output buffers,
   wherein the fragment processing pipeline includes:
      a shader read interface configured to read processed graphics data associated with an output buffer identifier from an output buffer stored in a memory, and
      a write interface configured to write processed graphics data associated with at least one output buffer identifier to an output buffer stored in the memory, and
   wherein the graphics data includes fragment data including at least two fragments within a single surface,
   wherein a first fragment is stored in a first output buffer, and a second fragment is stored in a second output buffer,
   wherein the first output buffer is associated with a depth map that includes sorted depth values for fragments at each pixel location associated with the first output buffer, visible fragments within the first output buffer being selected for shading based on the depth values stored in the depth map, and
   wherein the second output buffer is associated with a second depth map that includes sorted depth values for fragments at each pixel location associated with the second output buffer, visible fragments within the second output buffer being selected for shading based on the depth values stored in the second depth map.

2. The graphics processor of claim 1, further comprising a geometry processor configured to process the graphics data and configured to cull non-visible fragments prior to shading based on the stored depth map.

3. The graphics processor of claim 1, wherein an output buffer includes data represented in two or more data formats including fixed point and floating point or including different numbers of bits within the same output buffer.

4. The graphics processor of claim 1, wherein the output buffer identifier is readable and writable by the fragment processing pipeline.

5. The graphics processor of claim 1, wherein any of the multiple output buffers is selected for display using the address defined in the fragment processing pipeline.

6. The graphics processor of claim 1, wherein the fragment processing pipeline includes multiple registers, each register capable of outputting data to one or more of the multiple output buffers.

7. The graphics processor of claim 1, wherein the graphics processor resides within a computing system including a host processor.

8. The graphics processor of claim 1 wherein:
   the processed fragment data is read from the output buffer using the output buffer identifier.

9. The graphics processor of claim 1 wherein the fragment processing pipeline is further configured to process non-opaque fragments and store the fragments in the multiple output buffers, the depth map being used to blend the non-opaque fragments with the stored fragments that are visible fragments.

10. The graphics processor of claim 1, wherein the fragment processing pipeline is configured to select one of the output buffers for writing each of the fragments based on a procedurally computed function.

11. The graphics processor of claim 1, wherein the fragment processing pipeline is further configured to:
   compute a single depth value associated with the first fragment;
   sort the single depth value relative to other depth values associated with other fragments at the same location in the first output buffer;
   determine, based on the sorting of the depth values, that the single depth value represents a visible fragment;
   store a portion of the processed fragment data that includes lighting parameters in an additional output buffer; and
   read data corresponding to the first fragment from the additional output buffer.

* * * * *